(No Model.)
S. E. NUTTING.
SLATE RULING MACHINE.
No. 418,651. Patented Dec. 31, 1889.
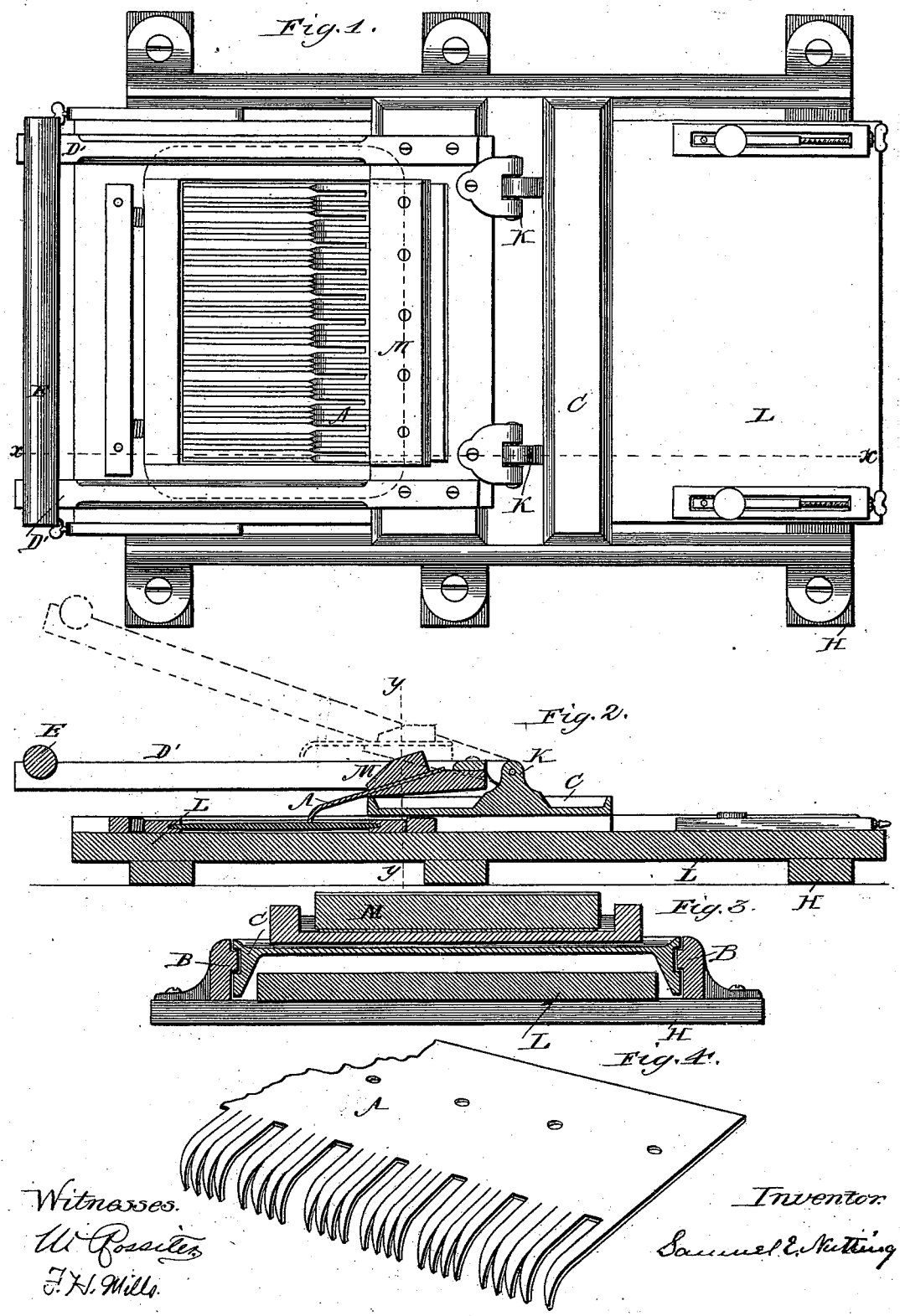

United States Patent Office.

SAMUEL E. NUTTING, OF CHICAGO, ILLINOIS, ASSIGNOR TO THOMAS CHARLES, OF SAME PLACE.

SLATE-RULING MACHINE.

SPECIFICATION forming part of Letters Patent No. 418,651, dated December 31, 1889.

Application filed September 7, 1885. Serial No. 176,301. (No model.)

*To all whom it may concern:*

Be it known that I, SAMUEL E. NUTTING, of Chicago, county of Cook, and State of Illinois, have invented new and useful Improvements in Slate-Ruling Machines, of which the following is a full and complete description, reference being had to the accompanying drawings.

My invention relates to some of the details pertaining to the general construction of the machine, and especially to the furrowing or cutting implement.

With reference to the drawings, Figure 1 is a plan view. Fig. 2 is a longitudinal vertical section through line $x\,x$, Fig. 1. Fig. 3 is a transverse vertical section through line $y\,y$, Fig. 2; and Fig. 4 is a detail view of the furrowing or cutting tool.

The structural portion of the machine consists of a bed-frame H and a sliding carriage C, movable within or on the former.

As shown in Fig. 3, carriage C has a slide-bearing in bed H by means of guide-rails B B.

M represents a head or clamping section for holding the marker, and is secured to the sliding carriage by hinge K. Arms D', which may be integral with head M or may be hinged at K, and said head secured thereto, extend forward and are connected at their ends by a rail or bar E, whereby the hinged portion may be manipulated, and whereby the carriage is operated, as hereinafter set forth.

The marking-teeth in the present example are integral with a metallic plate A, Fig. 4, and are constructed by suitably slotting the plate to a sufficient depth to form said teeth. In order to properly adapt the teeth to their work, it is important that they should be independently flexible; otherwise, when the surface of the slate is uneven, a depression may only be slightly marked, if marked at all. To this end I have the metal of proper thickness to give the desired flexibility. This may of course be controlled in a measure by the length of the teeth. As shown, the teeth are sharpened at their extremities and are curved some distance back therefrom, thus bringing the ends of said teeth in position to engage with the slate.

Separately-made flexible teeth may be secured to a head suitable for holding them, and may be substituted with equal results, though perhaps less convenient in the matter of construction.

The plate A, as shown in Fig. 2, is secured in head M and inclines somewhat downward in the direction of the toothed end, in which position the best flexible action is obtained.

The scope of reciprocating action of carriage C is regulated by means of adjustable stops, front and rear, whereby said action is adapted to the length or width of slates of different dimensions.

In the process of ruling, the slate is secured on the bed L in a proper position beneath the teeth by means affording convenience in placing or removing the same. Then by means of bar E, which serves as a handle, the hinged portion is elevated, as indicated by dotted lines, Fig. 2, and the carriage drawn forward. The hinged portion then being brought down to engage the teeth with the surface of the slate, the carriage is pushed in the opposite direction, thus carrying said teeth in their operation of ruling across the surface of the slate.

To regulate the depth to which the teeth are permitted to cut, I use set-screws (not shown) extending down through the hinged portion in such manner as to strike the bed-frame at the proper time, thus preventing further depression of said teeth. Any convenient means for the purpose may of course be adopted.

Having thus fully described my said invention, what I claim, and desire to secure by Letters Patent, is—

In a slate-ruling machine, the combination of bed-frame, sliding carriage, hinged arms, handle-bar, and cutting-tool having separately-curved flexible teeth adapted to bear vertically upon the surface of the slate, substantially as described.

SAMUEL E. NUTTING.

Witnesses:
THOS. CHARLES,
FRED. HILTON.